United States Patent [19]

Hong

[11] Patent Number: 4,840,427

[45] Date of Patent: * Jun. 20, 1989

[54] SEAT FOR AN AUTOMOBILE

[75] Inventor: Bahk Hong, Seoul, Rep. of Korea

[73] Assignee: Kia Motors Corporation, Rep. of Korea

[*] Notice: The portion of the term of this patent subsequent to Feb. 28, 2006 has been disclaimed.

[21] Appl. No.: 85,990

[22] Filed: Aug. 13, 1987

[51] Int. Cl.[4] ............................................. B60N 1/02
[52] U.S. Cl. .................................... 297/346; 248/419; 296/65.1; 297/103; 297/379
[58] Field of Search ............... 297/344, 345, 346, 235, 297/409, 378, 379, 103, 94; 248/419, 421; 296/65 R

[56] References Cited

U.S. PATENT DOCUMENTS

| | | | |
|---|---|---|---|
| 121,563 | 12/1871 | Warren et al. | 297/235 |
| 156,709 | 11/1874 | Mellimger et al. | 297/235 X |
| 177,526 | 5/1876 | Lawrence | 297/345 X |
| 283,370 | 8/1883 | Bauer | 297/235 |
| 284,153 | 8/1883 | Willits | 297/235 X |
| 321,625 | 7/1885 | Mellinger | 296/65 R |
| 340,948 | 4/1886 | Hutton et al. | 297/235 |
| 3,049,330 | 8/1962 | Coons et al. | 248/419 |
| 3,189,312 | 6/1965 | Bilancia | 297/346 X |
| 3,294,437 | 12/1966 | Belsky et al. | 296/65 R |
| 3,727,976 | 4/1973 | Lystad | 297/379 X |
| 4,046,349 | 9/1977 | MacAfee | 297/344 X |
| 4,081,051 | 3/1978 | Logsdon | 296/65 R X |
| 4,178,037 | 12/1979 | Pickles | 297/379 X |
| 4,312,537 | 1/1982 | Lindenberg | 297/379 X |
| 4,322,052 | 3/1982 | Hodge et al. | 296/65 R X |
| 4,368,916 | 1/1983 | Blasin | 297/378 X |
| 4,461,511 | 7/1984 | Berneking et al. | 297/379 X |
| 4,627,656 | 12/1986 | Gokimoto et al. | 297/379 X |

FOREIGN PATENT DOCUMENTS

| | | | |
|---|---|---|---|
| 2813534 | 10/1979 | Fed. Rep. of Germany | 297/345 |
| 897427 | 3/1945 | France | 248/419 |
| 1022021 | 2/1953 | France | 296/65 R |
| 1095113 | 5/1955 | France | 297/378 |
| 12347 | 1/1985 | Japan | 296/65 R |

Primary Examiner—Peter A. Aschenbrenner
Assistant Examiner—Thomas A. Rendos

[57] ABSTRACT

A seat for vehicle is provided comprising a seat back, a seat bottom, a pair of side brackets mounted on both sides of the bottom of said seat bottom, respectively, and a pair of seat supporting brackets, spaced from each other, mounted on the floor of the vehicle. The seat also includes two pairs of arms, each mounted at one end thereof on said side bracket and at the other end thereof on the lower end of said seat back, adapted to shift said seat back forwards and backwards. Between the side brackets and the seat supporting brackets, two pairs of legs are pivotably arranged, which are adapted to maintain a constant angle between the seat bottom and the floor of the vehicle, thus the seat bottom can be moved a certain distance by the pivoting of the legs. The seat for a vehicle also comprises a locking mechanism adapted to actuate and constrain the pivoting of the legs.

12 Claims, 5 Drawing Sheets

SEAT FOR AN AUTOMOBILE

TECHNICAL FIELD OF THE INVENTION

The present invention generally relates to a seat for a vehicle. More particularly, the present invention relates to a seat for a vehicle in which the seat back can be shifted forwards and backwards, and the seat bottom can vary its angle with respect to the floor of the vehicle when the seat bottom is moved back and forth.

BACKGROUND OF THE INVENTION

Generally, conventional seats for vehicles can be divided into two general groups, seats for a motor-car and seats for a bus. In the case of a seat for a motor-car, the seat back thereof can not be shifted although the seat bottom can slide on the floor of the car. In the case of a seat for a bus, the seat back can be shifted forwards and backwards and the seat bottom can slide on the floor of the bus.

Because the seat back of the motor-car is unable to be shifted forwards and backwards these seats do not enjoy great versatility. Indeed, due to the sliding of the seat bottom, a mat on the floor of the car can be damaged by the bottom surface of the seat bottom also, associated mechanical elements can be easily worn due to the friction generated between the seat bottom and the floor of the car. In contrast, bus seats do enjoy some versatility due to their construction. However, these seats are not entirely satisfactory from a comfort standpoint. Due to their construction, the fact that the seat bottom maintains a constant angle to the floor of the bus makes the seats uncomfortable. There are also problems of the damage of the mat of the floor of the bus due to the sliding seat as well as wearing of the mechanical parts as discussed in the case of the automobile.

There is therefore a need for an improved seat for an automobile.

SUMMARY OF THE INVENTION

An advantage of the present invention is to provide a seat for a vehicle which is able to eliminate the above-mentioned disadvantages encountered in the prior art.

In accordance with the present invention, an improved vehicle seat is provided. The vehicle seat comprises a seat back; a seat bottom; a pair of side brackets mounted on both sides of the bottom of said seat bottom, respectively; a pair of seat supporting brackets spaced from each other and mounted on the floor of the vehicle; two pairs of legs being pivotably arranged between said side brackets and said seat supporting brackets, said legs adapted to maintain a constant angle between said seat bottom and the floor of the vehicle and to shift the bottom seat by a certain distance by the pivoting thereof. A locking means is also provided that includes a pair of handles, a pair of wires, a pair of locking plates, a pair of locking links, and a pair of springs. The locking means is adapted to actuate and prevent the pivoting of said legs.

The seat back can be shifted forwards and backwards, by means of two pairs of arms each pair arranged at each side of the seat. Each arm is mounted at one end thereof on the side bracket and at the other end thereof on the lower end of the seat back. After the seat back is shifted, the seat bottom can be moved by being pushed backwards. At this time, an angle of the seat bottom to the floor of the vehicle is varied, so that the passenger is comfortable.

The present invention may best be understood with reference to the following description taken in connection with the appended drawings.

DETAILED DESCRIPTION OF THE PRESENTLY PREFERRED EMBODIMENTS

Figure 1:
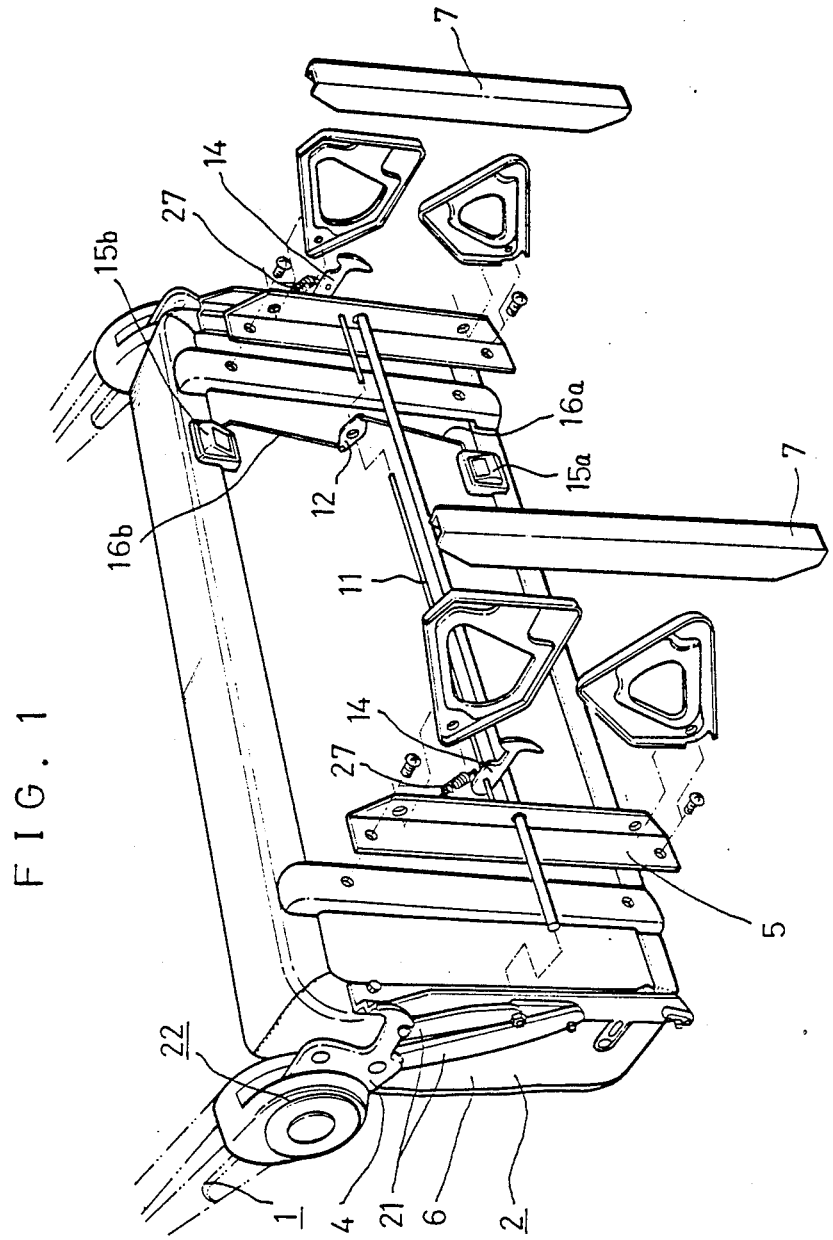
FIG. 1 illustrates an exploded perspective view of an embodiment of the seat of the present invention.

Referring now to the figures, an embodiment of the present invention is illustrated. The seat illustrated is a reversible seat for a vehicle and comprises a seat back 1 and a seat bottom 2. The seat back 1 includes a body portion 3 and the seat bottom 2 includes a body portion 6. To the bottom end of the seat back 1, a knuckle 4 is attached. To the bottom surface of the seat bottom 2, a side bracket 5 is fixedly mounted. The seat back 1 is pivotaly connected to the seat bottom 2 by means of arms 21 which are pivotly mounted between the knuckles 4 and the side brackets 5. Between the side brackets 5 mounted on the seat bottom 2 and a respective seat supporting bracket 7 fixed to the floor of the vehicle, two legs 9a and 9b are pivotly mounted. The legs 9a and 9b have locking protrusions 8a and 8b, respectively. At the bottom surface of the seat bottom 2, a locking shaft 11 is journalled on. To the locking shaft 11, a locking plate 12 and a pair of locking links 14, each having a locking groove 13, are pivotly mounted. The locking plate 12 is fixed to the locking links 14. To the upper and lower ends of the locking plate 12, wires 16a and 16b are connected at one end thereof. The wires 16a and 16b are also connected at a second end thereof to handles 15a and 15b, respectively.

The seat of the present invention also includes a locking release lever 17, a locking arm 18, a shaft 19, a locking pin 20, a leak lining mechanism 22, a wire lever 23, a shaft 24, a hook 25, a spring holding hole 26, a spring 27, and bolts A-D. The function and cooperation of these elements of the seat of the present invention will be discussed in more detail below.

The seat back 1 of the present invention is constructed so that it can be shifted forwards and backwards. When a passenger wants to shift the seat back 1, the passenger lifts the locking release lever 17 upwards. This causes the locking arm 18, fixed to said locking release lever 17, to pivot in a counter-clockwise manner about the shaft 19, causing the locking pin 20 to be released from the locking arm 18. When the locking pin 20 is released from the locking arm 18 as the passenger pushes the body 3 of the seat back 1 in the desired direction, the body 3 of the seat back 1 is shifted to the desired position by the linkage movement of the arm 21 connected by the knuckles 4 to said seat back. The locking arm 20 is then allowed to reengage the pin 20, securing the seat back 1 in position.

After the body 3 of the seat back is shifted to the desired position, the passenger can then operate the leak lining mechanism 22 positioned at the lower end of said seat back. The leak lining mechanism 22 functions to vary the angle between the body 3 of the seat back and the seat bottom 6 to an angle at which an occupant of the seat feels most comfortable.

After the seat back has been shifted as described above, the seat is facing the opposite way from its previous position so that pairs of seats may be facing each other instead of all the seats facing the same way, or vice versa, the space in front of the seats that have been reversed may now be short, causing discomfort to the occupants. To prevent such discomfort of the passengers, the seat bottom 6 can be moved backwards. Through this movement of the seat bottom 2, the angle between the body 6 of the seat bottom 2 and the floor of the vehicle can be varied in accordance with the present invention. Even in the case when the seat back is reversed, therefore, the body 6 of the seat bottom 2 can be adjusted to maintain a constant angle at which the passenger is comfortable.

The backward and forward directional movement of the seat bottom 2 will now be described in detail.

Figure 2:
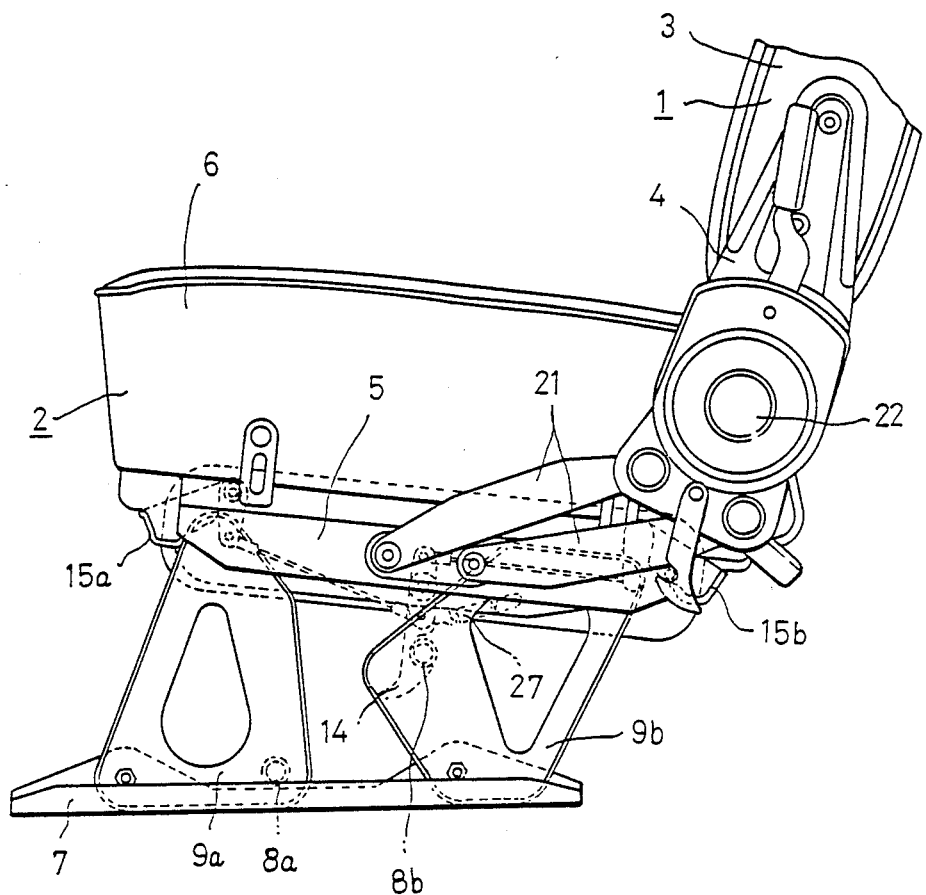
FIG. 2 illustrates a side view of the seat of the present invention.
Figure 3:
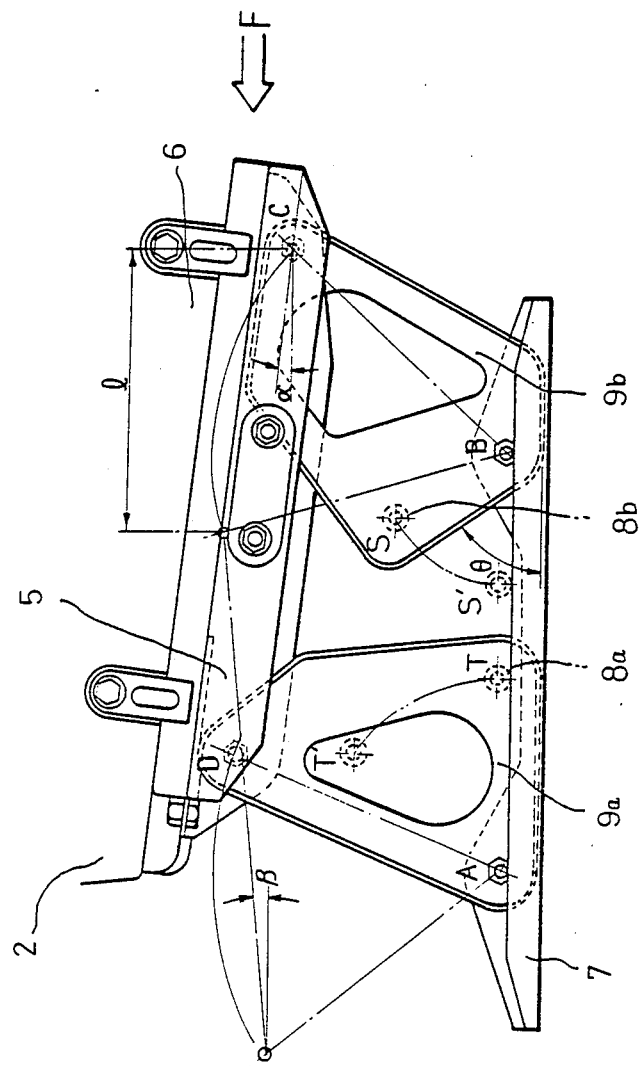
FIG. 3 illustrates the pivoting of legs of the seat of the present invention.
Figure 4:
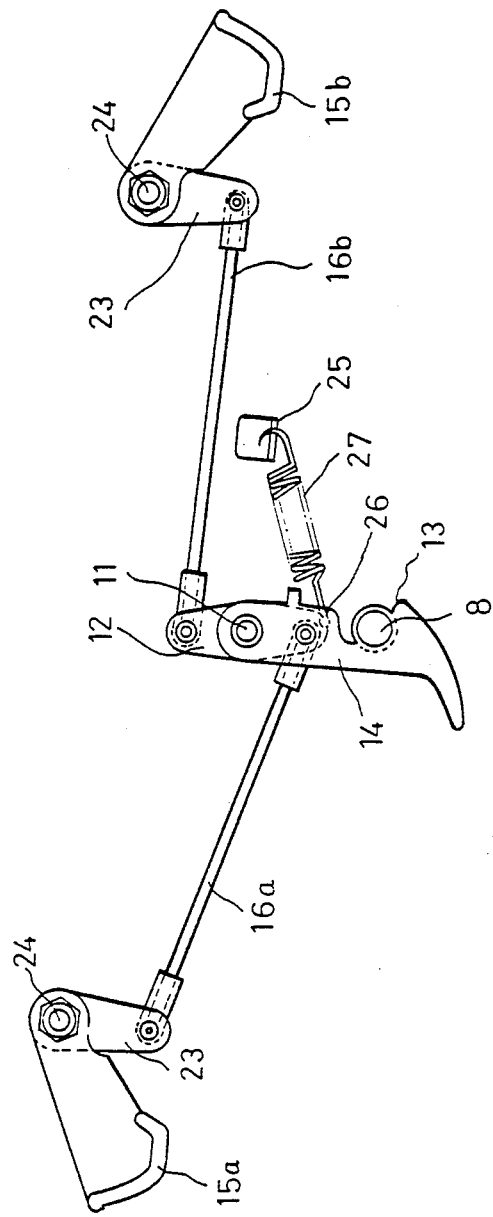
FIG. 4 illustrates the locking device in accordance with the present invention.
Figure 5:
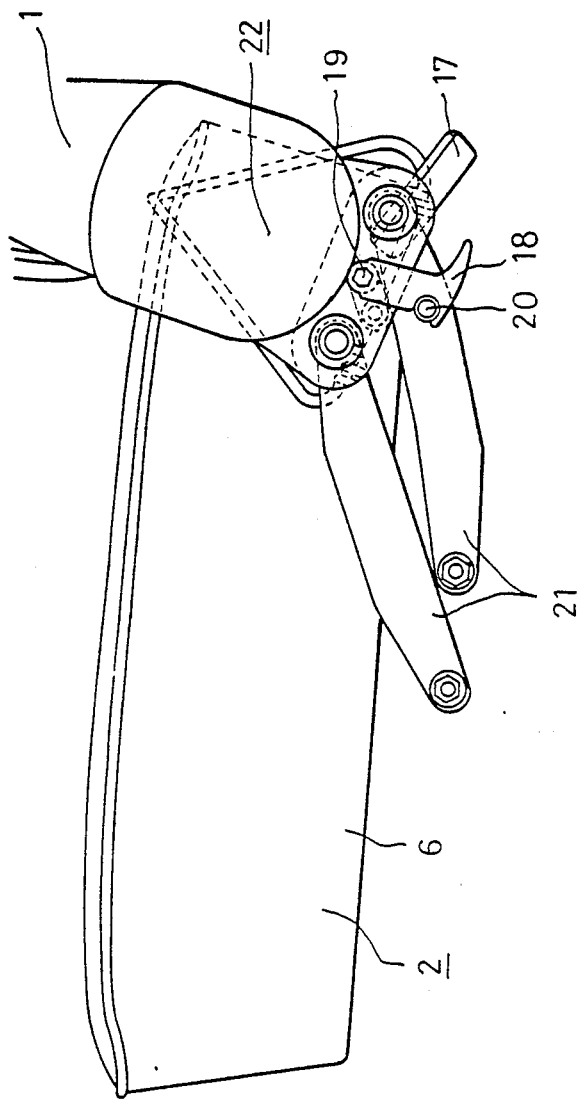
FIG. 5 illustrates the mounting of arms of the seat of the present invention.

In order to change the position of legs 9a and 9b from the condition shown in FIG. 2 and FIG. 3, as a first step, the locking device shown in FIG. 4 has to be released. To this end, the passenger first lifts the handle 15a, positioned at the body 6 of the bottom of the seat bottom 2, upwards. This causes a wire lever 23 fixably connected to the handle 15a to pivot about the shaft 24 in a clockwise direction, so that the wire 16a is pulled toward the left side of the bottom seat 2 illustrated in FIG. 4. Accordingly, the wire 16a forces the locking plate 12 and the shaft 11 also to pivot clockwise, so that the locking links 14 fixed to said shaft 11 pivots clockwise, thereby causing the locking protrusions 8b to be released from the locking grooves 13. Thus, legs 9a and 9b can then be pivoted freely.

Although, in the figures only one side of the seat of the present invention is shown, it should be appreciated that there are two sets of knuckles 4, side brackets 4, arms 21, legs 9a and 9b, and locking lever 17 arranged on both sides of the seat back or the seat bottom 2, respectively, in a similar relationship and cooperate similarly.

As illustrated in FIG. 3, the legs 9a and 9b are secured between the side bracket 5 and the seat supporting bracket 7 by bolts A-D. With the locking device in the released condition of the locking device as above-mentioned, pushing the body 6 of the bottom seat in the direction indicated by arrow "F" causes the legs 9a and 9b mounted between the side bracket 5, fixed to the bottom of the seat bottom 2 and the seat supporting bracket 7 to pivot about bolts A and B, respectively, in a counter-clockwise direction by an angle θ. This pivoting of the legs 9a and 9b, the side bracket 5, and thus, the body 6 of the seat bottom 2 to be shifted horizontally through a distance "1".

Before the body 6 of the seat bottom 2 is shifted, the front of the seat bottom 2 (the left-hand side as seen in FIGS. 2 and 3) is higher than the rear (with the bottom inclined, for example, at an angle a), so that the passenger is comfortable. After the body 6 of the seat bottom 2 has been shifted, the front of the seat bottom (the right-hand side as seen in FIG. 3) is higher than the rear (with the seat bottom inclined, for example, by an angle α) level thereof (for example, by an angle β), so that the passenger is always comfortable.

When the legs 9a and 9b are pivoted through an angle θ, the locking protrusions 8a and 8b of said legs are moved from position T to position T' on FIG. 3 and from position S to position S', respectively. Accordingly, although the protrusions 8b is engaged in the locking groove 13 of the locking link 14 before the seat bottom 2 is shifted when the seat is shifted the protrusion 8b is moved to position S', and said protrusion 8a is moved to position T' and thereby engaged in the locking groove 13 of the locking link 14. This engagement is accmplished by the spring force of the spring 27 which is connected at one end thereof to a hook 25 formed on the side bracket 5 and at the other end thereof to a hole 26 formed in the middle of the locking link 14.

When the passenger wants to move the body 6 of the seat bottom 2 backwards, or in a reverse direction the passenger lifts the handle 15b upwards. This causes the wire 16b to be pulled toward the right side of the seat bottom 2 illustrated in FIG. 4. Accordingly, the wire 16b forces the locking link 14 to pivot about the shaft 11 in a clockwise manner, so that the locking protrusion 8a can be disengaged from the locking groove 13. In this condition, pushing the body 6 of the seat bottom 2 in a direction opposite to the direction "F" causes legs 9a and 9b to pivot through an angle O about bolts A and B, and the seat bottom 2 to be shifted, by the distance "1", towards the right side as seen in FIG. 4. At this time, the seat bottom 2 maintains an angle a, to the floor of the automobile, so that the locking protrusion 8b can be engaged in the locking groove of the locking link 14, thereby constraining the side bracket 5 to move right and left.

As apparent from the above description, the seat of the present invention enables the seat back to be shifted backwards and forwards. The seat of the present invention also allows the seat bottom to be shifted a certain distance by pivoting legs while still maintaining a certain angle to the floor of the vehicle, so that the passenger will be comfortable and without damaging the mat on the floor of the vehicle.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. An adjustable seat for a vehicle comprising:
   a seat back;
   a seat bottom;
   the seat back being coupled to a device for adjusting the forward or backward position of the adjustable seat;
   means for adjusting the angle of the seat back to the seat bottom, the means for adjusting being coupled to the seat back; and
   the seat bottom including means for moving the seat bottom forwards and backwards and adjusting the angle of the seat bottom with respect to a floor of the vehicle, the means for moving the seat bottom forward and backward including a pair of side brackets secured to a bottom of the seat bottom, a pair of seat support brackets secured to a floor of the vehicle, and two sets of legs, each set of legs including a pair of legs that are pivotally connected to a separate side bracket and support bracket, the legs being pivotal from a first position to a second position, at least one pair of lgs including a pin on each of the legs, the seat bottom further including means for removably securing the legs in the first or second position, the means for removably securing including at least one handle secured to a connecting member, the connecting member being secured to a locking member for receiving a pin on the legs, the locking member being coupled to a spring so as to be biased against the pin, the handle cooperating with the connecting member to cause the locking member to release the pin.

2. The seat of claim 1 wherein the means for moving the seat back forward or backward includes a knuckle secured to an end of the seat back, a pair of arms pivotably connected at one end to the knuckle and at a second end to a bracket secured to the seat bottom, and a locking release lever coupled to the seat back for locking the arms in position.

3. The seat of claim 1 wherein the means for adjusting the angle of the seat back with respect to the seat bottom includes a seat reclining mechanism secured to an end of the seat back.

4. The seat of claim 1 wherein the means for moving the seat back forward or backward includes a pair of knuckles secured on opposite sides of the seat, two sets of arms pivotally connected at a second end thereof to one of two brackets secured on opposite sides of the seat bottom, and means for removably securing the seat back in a forward or backward position coupled to the seat back.

5. The seat of claim 1 wherein the means for removably securing includes two handles.

6. The seat of claim 1 wherein the legs have a trapezoidal shape.

7. The seat of claim 1 wherein said adjustable seat is reversible.

8. A seat for a vehicle comprising a seat back;
a seat bottom;
a pair of side brackets mounted on either side of a bottom of the seat bottom;
two pairs of arms, each mounted at one end thereof to a side bracket and at another end thereof to a lower end portion of the seat back and so constructed and arranged to permit shifting of the seat back forwards and backwards;
a pair of seat-supporting brackets spaced from each other and arranged to be mounted on a floor of the vehicle; and
two pairs of legs pivotably arranged between the said side brackets and the seat-supporting brackets, the legs being so constructed and arranged to maintain a constant angle between the seat bottom and the seat-supporting brackets and to permit the seat bottom to move through a certain distance by the pivoting thereof.

9. The seat of claim 8, including a locking means coupled to the seat bottom, the locking means including a pair of handles, each handle being connected to a locking link, and a pair of springs, each spring being connected to one of the locking links, the locking means being so constructed and arranged to either permit or prevent the pivoting of the legs.

10. The seat of claim 8 wherein the seat is reversible.

11. A vehicle including a reversible seat, the seat comprising:
a seat back;
a seat bottom;
a pair of side brackets mounted on either side of a bottom of the seat bottom;
two pairs of arms, each mounted at one end thereof to a lower end portion of the seat back and so constructed and arranged to permit shifting of the seat back fowards and backwards;
a pair of seat-supporting brackets spaced from each other and arranged to be mounted on a floor of the vehicle; and
two pairs of legs pivotably arranged between the said side brackets and the seat-supporting brackets, the legs being so constructed and arranged to maintain a constant angle between the seat bottom and the seat-supporting brackets and to permit the seat bottom to move through a certain distance by the pivoting thereof.

12. The vehicle of claim 11 wherein the seat includes a locking means coupled to the seat bottom including a pair of handles, each handle being coupled to a wire, the wires each being coupled to a locking plate, each locking plate being coupled to a locking link, and a pair of springs, each spring being connected to one of the locking links, the locking means being so constructed and arranged to permit and prevent the pivoting of the legs.

* * * * *